United States Patent
Kankani et al.

(10) Patent No.: US 10,467,134 B2
(45) Date of Patent: Nov. 5, 2019

(54) DYNAMIC ANNEAL CHARACTERISTICS FOR ANNEALING NON-VOLATILE MEMORY

(71) Applicant: SanDisk Technologies LLC, Plano, TX (US)

(72) Inventors: Navneeth Kankani, Fremont, CA (US); Linh Truong, San Jose, CA (US); Sarath Puthenthermadam, San Jose, CA (US); Deepanshu Dutta, San Jose, CA (US)

(73) Assignee: SANDISK TECHNOLOGIES LLC, San Jose, CA (US)

( * ) Notice: Subject to any disclaimer, the term of this patent is extended or adjusted under 35 U.S.C. 154(b) by 117 days.

(21) Appl. No.: 15/247,910

(22) Filed: Aug. 25, 2016

(65) Prior Publication Data
US 2018/0060230 A1    Mar. 1, 2018

(51) Int. Cl.
*G06F 12/02*    (2006.01)

(52) U.S. Cl.
CPC .. *G06F 12/0246* (2013.01); *G06F 2212/1036* (2013.01); *G06F 2212/7205* (2013.01); *G06F 2212/7206* (2013.01); *G06F 2212/7207* (2013.01)

(58) Field of Classification Search
CPC .... G11C 7/20; G11C 5/02; G11C 7/24; H01L 23/345; H01L 23/3675; H01L 23/3736; H01L 23/467; G06F 12/0246
USPC ........................................................ 711/166
See application file for complete search history.

(56) References Cited

U.S. PATENT DOCUMENTS

| | | | |
|---|---|---|---|
| 6,700,099 B2 | 3/2004 | Cole, Sr. et al. | |
| 7,821,828 B2 | 10/2010 | Song et al. | |
| 8,138,573 B2 | 3/2012 | Cannon et al. | |
| 8,341,335 B2 | 12/2012 | Weingarten et al. | |
| 8,344,475 B2 | 1/2013 | Shaeffer et al. | |
| 8,488,387 B2 | 7/2013 | Lue et al. | |
| 8,497,544 B2 | 7/2013 | Bronner et al. | |
| 8,516,343 B2 | 8/2013 | Flynn et al. | |
| 8,580,645 B2 * | 11/2013 | Prall ................ | H01L 21/26506 438/301 |
| 8,824,212 B2 | 9/2014 | Lue | |
| 9,761,290 B1 | 9/2017 | Kankani et al. | |
| 2006/0103007 A1 | 5/2006 | Aitken et al. | |
| 2009/0201729 A1 | 8/2009 | Song et al. | |
| 2010/0025811 A1 | 2/2010 | Bronner et al. | |

(Continued)

OTHER PUBLICATIONS

U.S. Appl. No. 15/247,912 Notice of Allowance dated May 10, 2017.

(Continued)

*Primary Examiner* — Pierre Miche Bataille
(74) *Attorney, Agent, or Firm* — Kunzler Bean & Adamson, PC

(57) ABSTRACT

Apparatuses, systems, methods, and computer program products are disclosed for annealing non-volatile memory. A controller identifies one or more life cycle characteristics of a non-volatile storage element. The controller selects an anneal duration and an anneal temperature for annealing the non-volatile storage element. The anneal duration and the anneal temperature are based on the one or more life cycle characteristics. The controller anneals the non-volatile storage element using the selected anneal duration and anneal temperature.

20 Claims, 10 Drawing Sheets

(56) References Cited

U.S. PATENT DOCUMENTS

| | | |
|---|---|---|
| 2011/0299317 A1* | 12/2011 | Shaeffer ............. G11C 13/0002 |
| | | 365/106 |
| 2013/0148437 A1 | 6/2013 | Bronner et al. |
| 2013/0214360 A1* | 8/2013 | Siprak ................... H01L 21/845 |
| | | 257/365 |
| 2013/0238839 A1 | 9/2013 | Weingerten et al. |
| 2014/0140156 A1 | 5/2014 | Shoemaker et al. |
| 2014/0254286 A1* | 9/2014 | Bronner ............. G11C 13/0002 |
| | | 365/185.29 |
| 2015/0230327 A1 | 8/2015 | Ellis et al. |
| 2016/0071608 A1* | 3/2016 | Bronner ............. G11C 13/0002 |
| | | 365/185.18 |
| 2016/0212512 A9 | 7/2016 | Mazed |
| 2016/0320495 A1 | 11/2016 | Ying |

OTHER PUBLICATIONS

U.S. Appl. No. 15/247,912 Office Action dated Jan. 12, 2017.
H.-T. Lue et al., "Radically Extending the Cycling Endurance of Flash Memory (to >100M Cycles) by Using Built-In Thermal Annealing to Self-Heal the Stress-Induced Damage" Macronix International, IEDM, Dec. 2013.

* cited by examiner

800 ⤸

| Anneal # 802 | Temp. 804 | Duration 806 | Endurance Gain 808 |
|---|---|---|---|
| n | 250 °C | 0.5 hrs | 50% |
| n-1 | 200 °C | 13.3 hrs | 40% |
| ... | ... | ... | ... |
| 2 | 175 °C | 30 hrs | 80% |
| 1 | 170 °C | 45 hrs | 90% |
| 0 | 150 °C | 240 hrs | 100% |

DYNAMIC ANNEAL CHARACTERISTICS FOR ANNEALING NON-VOLATILE MEMORY

TECHNICAL FIELD

The present disclosure, in various embodiments, relates to non-volatile memory and more particularly relates to dynamic anneal characteristics for annealing non-volatile memory.

BACKGROUND

Writing and erasing various types of non-volatile memory can cause damage to the storage medium. For example, in flash memory, which stores data by storing charge on a floating gate, writing and erasing may damage the tunnel oxide layer between the substrate and the floating gate, creating sites in the oxide layer that trap charge carriers. Charge storage and leakage via trap sites may cause data errors. Thus, as the density of trap sites increases due to repeated writing and erasing, data error rates may also increase. Cumulative damage caused by repeated writing and erasing may limit the useful lifetime of various types of non-volatile memory.

Annealing certain types of non-volatile memory at higher-than-operating temperatures may reverse damage caused by repeated writing and erasing. For example, thermal annealing of flash memory may provide sufficient energy to restore trap sites to their original state, thereby reducing the number of defects and improving the longevity and endurance of an annealed memory device. However, annealing temperatures may themselves cause charge leakage and data errors, making it impractical to anneal operating non-volatile memory. Additionally, higher anneal temperatures or longer anneal durations may reverse more damage than a lower-temperature or shorter anneal, but may also use more energy, increase cooling requirements, cause increased data error rates for nearby non-volatile memory, take a non-volatile memory element out of operation longer, or the like.

SUMMARY

Apparatuses are presented for annealing non-volatile memory. In one embodiment an apparatus includes a controller configured to identify one or more life cycle characteristics of a non-volatile storage element. In a certain embodiment, the controller is configured to select an anneal duration and an anneal temperature for annealing the non-volatile storage element. In a further embodiment, the controller may select the anneal duration and the anneal temperature based on the one or more life cycle characteristics. In one embodiment, the controller is configured to anneal the non-volatile storage element using the selected anneal duration and anneal temperature.

Systems are presented for annealing non-volatile memory. In one embodiment, a system includes an array of non-volatile memory elements. In a certain embodiment, the system includes a heating element for annealing one or more of the non-volatile memory elements. In a further embodiment, the system includes a controller configured to select a non-volatile memory element for annealing, from the array of non-volatile memory elements, based on one or more life cycle characteristics of the selected non-volatile memory element. In one embodiment, the controller is configured to determine an anneal duration for annealing the selected non-volatile memory element. In a certain embodiment the anneal duration may be based on the one or more life cycle characteristics. In a further embodiment, the controller is configured to control the heating element to anneal the selected non-volatile memory element for the determined anneal duration.

Methods are presented for annealing non-volatile memory. In one embodiment, a method includes determining one or more life cycle characteristics of a non-volatile memory element. In a certain embodiment, the method includes determining a set of anneal characteristics for the non-volatile memory element based on the one or more life cycle characteristics. In a further embodiment, the set of anneal characteristics may include an anneal duration and/or an anneal temperature. In one embodiment, the method includes annealing the non-volatile memory element using the set of anneal characteristics.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
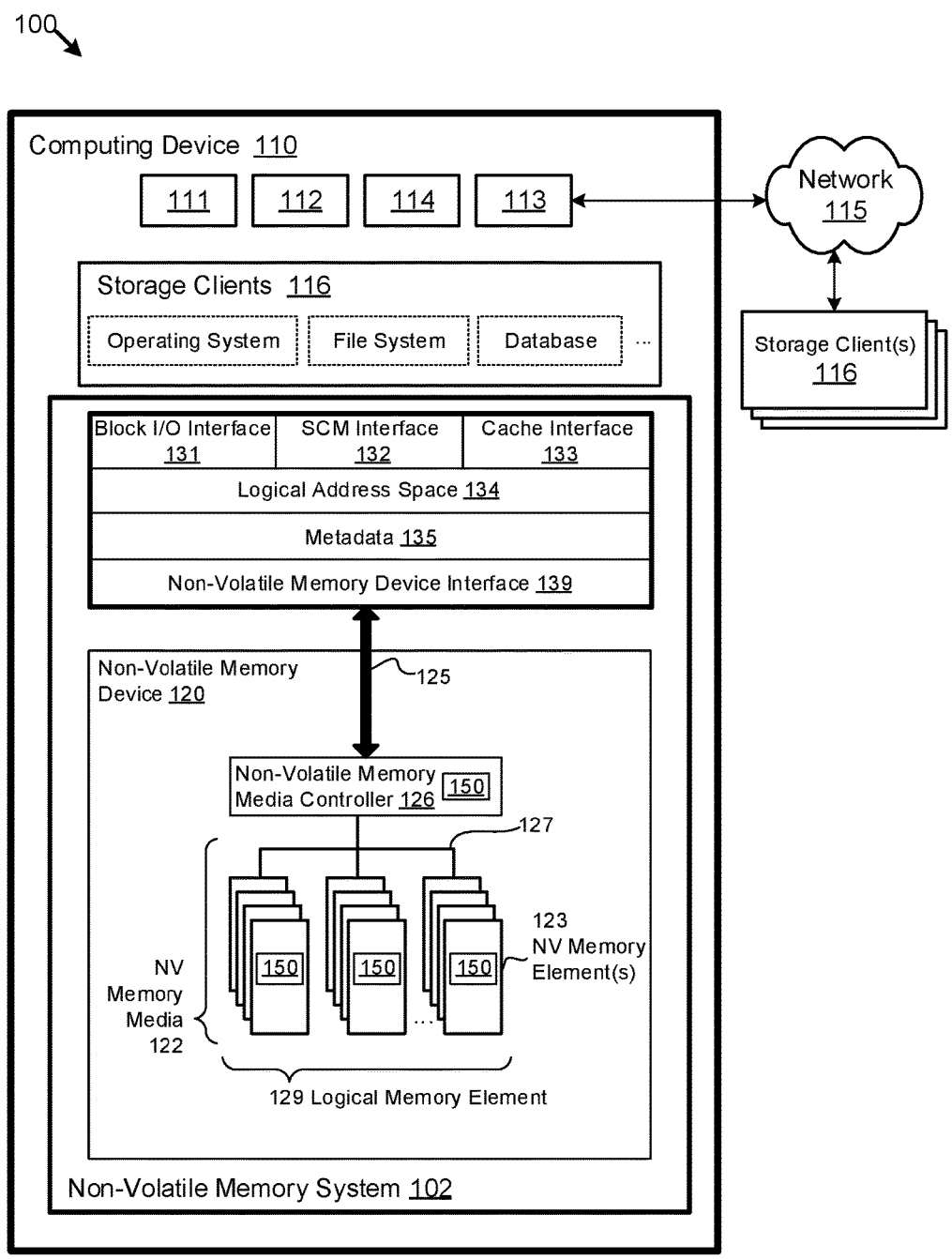
FIG. 1 is a schematic block diagram of one embodiment of a system comprising an anneal component.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of preceding figures. Like numbers may refer to like elements in the figures, including alternate embodiments of like elements.

FIG. 1 is a block diagram of one embodiment of a system 100 comprising an anneal component 150 for a non-volatile memory device 120. The anneal component 150 may be part of and/or in communication with one or more of a non-volatile memory media controller 126, a non-volatile memory element 123, a device driver, or the like. The anneal component 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 124 to a communication network 115, such as an Internet Protocol network, a Storage Area Network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, one or more portions of the anneal component 150 may be embodied as one or more computer readable instructions stored on the non-transitory storage media 114.

The non-volatile memory system 102, in the depicted embodiment, includes an anneal component 150. The anneal component 150, in one embodiment, identifies one or more life cycle characteristics of a non-volatile memory element 123. In a certain embodiment, the anneal component 150 selects an anneal duration and/or an anneal temperature for annealing the non-volatile memory element 123. In a further embodiment, the anneal component 150 may select the anneal duration and/or the anneal temperature based on the one or more life cycle characteristics. In one embodiment, the anneal component 150 is configured to anneal the non-volatile memory element 123 using the selected anneal duration and/or/or anneal temperature. In certain embodiments, annealing a non-volatile memory element 123 may reverse damage caused by repeated writing and erasing, heal defects, restore charge trap sites to an original state, or otherwise improve the longevity or endurance of the annealed non-volatile memory element 123.

In some embodiments, anneal cycles with the same anneal characteristics (e.g., duration, temperature) may provide differing benefits at different points in the life cycle of the device or of the non-volatile memory element 123. For example, at an early stage in the life cycle of a non-volatile memory element, when little damage has accumulated, a lower-temperature or shorter anneal may reverse or heal existing damage. In another embodiment, where more damage has accumulated, a longer or higher-temperature anneal may reverse or heal more damage than a shorter or lower-temperature anneal. However, in comparison to a shorter or lower-temperature anneal, a longer or higher-temperature anneal may use more energy, increase cooling requirements, cause increased data error rates for nearby non-volatile memory, take a non-volatile memory element 123 out of operation longer, or the like. Thus, in certain embodiments, dynamically selecting anneal characteristics based on the life cycle of a non-volatile memory element 123 may provide a dynamic balance between increasing the endurance or longevity of the non-volatile memory element 123 and avoiding complications.

In one embodiment the anneal component 150 may comprise logic hardware of one or more non-volatile memory devices 120, such as a non-volatile memory media controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In another embodiment, the anneal component 150 may comprise executable software code, such as a device driver or the like, stored on the computer readable storage medium 114 for execution on the processor 111. In a further embodiment, the anneal component 150 may include a combination of both executable software code and logic hardware.

In one embodiment, the anneal component 150 is configured to receive requests relating to annealing from a device driver or other executable application via a bus 125 or the like. The anneal component 150 may be further configured to communicate with a device driver or other application via the bus 125. Accordingly, the anneal component 150, in some embodiments, may comprise and/or be in communication with one or more direct memory access (DMA) modules, remote DMA modules, bus controllers, bridges, buffers, and so on to facilitate communication of information relating to annealing. In another embodiment, the anneal component 150 may receive anneal requests as an API call from a storage client 116, as an IO-CTL command, or the like. The anneal component 150 is described in greater detail below with regard to FIGS. 6 and 7.

According to various embodiments, a non-volatile memory controller 126 comprising an anneal component 150 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the non-volatile memory media controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective non-volatile memory media controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more non-volatile memory media controllers 126.

A device driver may present a logical address space 134 to the storage clients 116 through one or more interfaces. As discussed above, the logical address space 134 may comprise a plurality of logical addresses, each corresponding to respective media locations the on one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 126 is part of and/or in communication with one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, expansion cards, or the like. A non-volatile memory media controller 126 may be configured to manage data operations on the non-volatile memory media 122, and may comprise one or more processors, programmable processors (e.g., FPGAs), ASICs, micro-controllers, or the like. In some embodiments, the non-volatile memory media controller 126 is configured to store data on and/or read data from the non-volatile memory media 122, to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The non-volatile memory controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the non-volatile memory media controller 126 over a bus 125, as described above.

Figure 2:
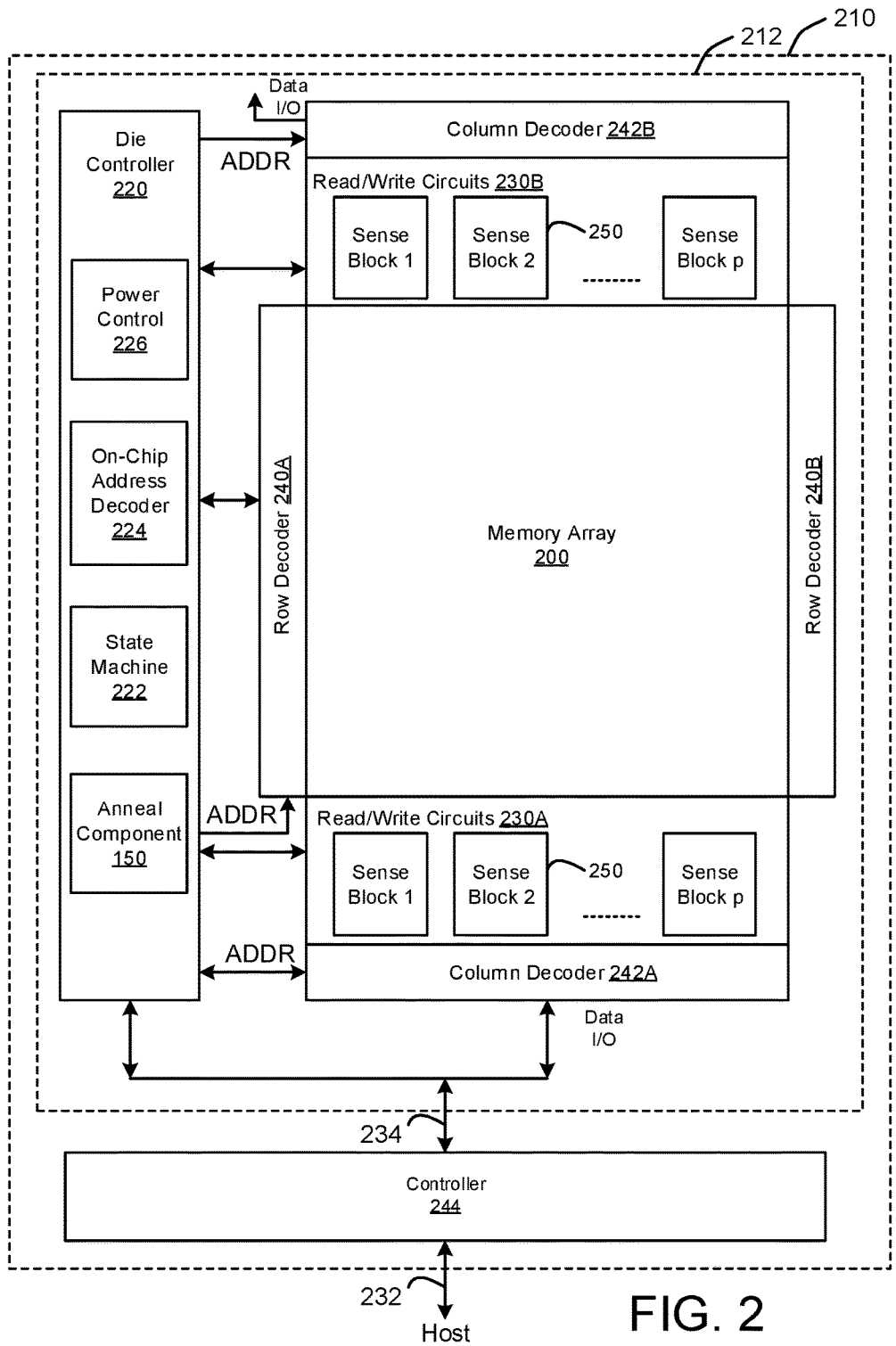
FIG. 2 is a schematic block diagram illustrating one embodiment of a non-volatile storage device comprising an anneal component.

FIG. 2 illustrates an embodiment of a non-volatile storage device 210 that may include one or more memory die or chips 212. The non-volatile storage device 210 may be substantially similar to the non-volatile memory device 120 described with reference to FIG. 1. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

Die controller 220, in one embodiment, cooperates with the read/write circuits 230A/230B to perform memory operations on the memory array 200. The die controller 220, in certain embodiments, includes an anneal component 150, a state machine 222, an on-chip address decoder 224, and a power control circuit 226. The anneal component 150, in one embodiment, is configured to identify one or more life cycle characteristics of the memory array 200, select an anneal duration and/or an anneal temperature based on the life cycle characteristics, and anneal the memory array 200 using the selected anneal duration and anneal temperature. The anneal component 150, in certain embodiments, may include software of a device driver, and/or hardware in a device controller 244, a die controller 220 and/or state machine 222.

The state machine 222, in one embodiment, provides chip-level control of memory operations. The on-chip address decoder 224 provides an address interface to convert between the address that is used by the host or a memory controller to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

Figure 3:
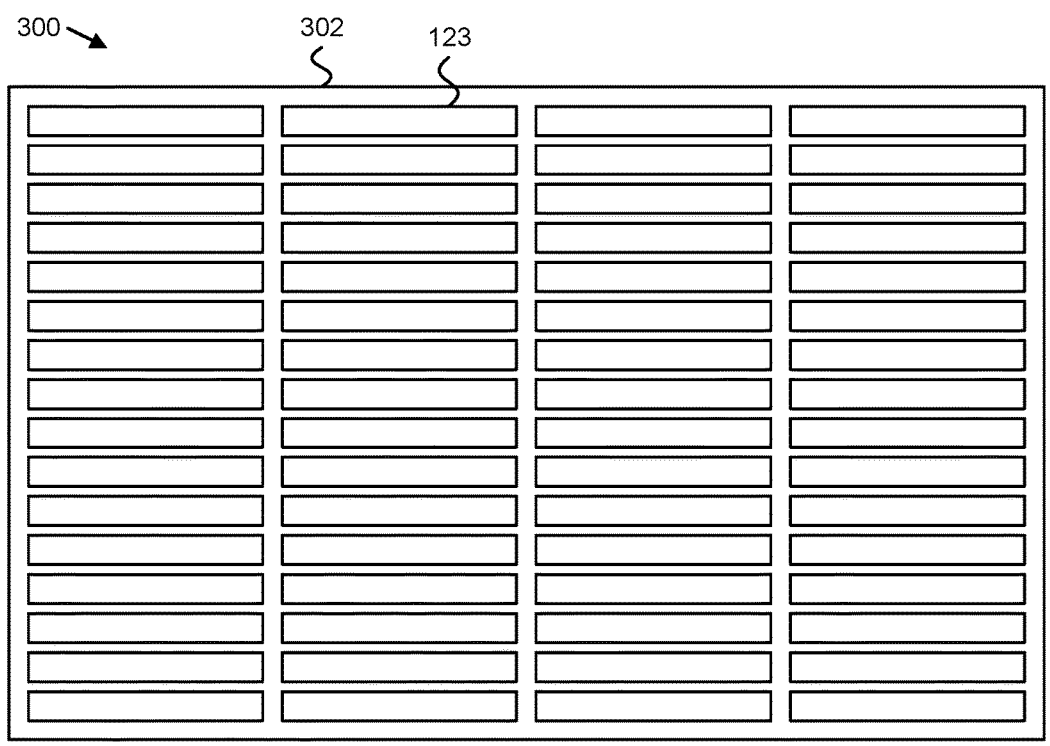
FIG. 3 is a top view illustrating one embodiment of a system comprising an enclosure for multiple non-volatile memory elements.

FIG. 3 depicts a system 300 comprising an enclosure 302 for multiple non-volatile memory elements 123. In various embodiments, the enclosure 302 may include any device that encloses multiple non-volatile memory elements 123. In one embodiment, the enclosure 302 may include a power supply, processor, memory, and the like, and may be a server that includes multiple non-volatile memory elements 123. In another embodiment, the enclosure 302 may be a disk shelf, or the like, that encloses multiple non-volatile memory elements 123 and provides connections between the non-volatile memory elements 123 and one or more external computers or controllers. In a certain embodiment, the enclosure 302 may be a storage appliance. For example, in one embodiment, the enclosure 302 may be a 3U rack mounted appliance.

In various embodiments, the enclosure 302 may include ports or connectors that allow clients 116 to access the non-volatile memory elements 123. For example, in various embodiments, the enclosure may include one or more Fibre Channel connections, serial attached SCSI (SAS) connections, Ethernet connections, or the like. In a certain embodiment, an enclosure 302 may include eight SAS connections, each providing data transfer rates of up to six gigabits per second. For example, a four lane SFF-8088 connector may provide four six gigabit per second connections, and an enclosure 302 may include two or more four lane SFF-8088 connections.

In certain embodiments, the enclosure 302 may include internal connections for a plurality of non-volatile memory elements 123. For example, in one embodiment, the enclosure 302 may include a backplane including SAS connectors, PCIe connectors, or the like, that couple to the non-volatile memory elements 123 to communicate commands, addresses, and/or data.

In one embodiment, the non-volatile memory elements 123 may be substantially similar to the non-volatile memory elements 123 described above with regard to FIG. 1, or to the non-volatile storage device 210, or memory die 212 described above with regard to FIG. 2. In various embodiments, a non-volatile memory element 123 may include a die plane, die, chip, chip package, expansion card, traditional hard disk drive form factor for non-volatile memory, or the like. In certain embodiments, the non-volatile memory elements 123 may be expansion cards, separate solid-state drives, or the like. For example, in one embodiment, the non-volatile memory elements 123 may be PCIe cards. In another embodiment, the non-volatile memory elements 123 may be SAS solid-state drives, SATA solid-state drives, or the like.

In certain embodiments, an array or plurality of non-volatile memory elements 123 may be disposed within and connected to the enclosure 302. For example, in one embodiment, the system 300 may include up to 64 non-volatile memory elements 123, each providing 8 terabytes of non-volatile memory, so that the system 300 includes up to half a petabyte of non-volatile memory. Further configurations including various amounts of memory per non-volatile memory element 123 and/or various numbers of non-volatile memory elements 123 will be clear in view of this disclosure.

In one embodiment, the non-volatile memory elements 123 may be configured as one or more arrays using striping, mirroring and/or parity. For example, the non-volatile memory elements 123 may be configured in a redundant array of independent disks (RAID). In another embodiment, the non-volatile memory elements 123 may be configured as one or more logical volumes that span multiple non-volatile memory elements 123 without redundancy or striping.

In certain embodiments, the non-volatile memory elements 123 (or sets of the non-volatile memory elements 123) may be independently annealed. For example, in one embodiment, the enclosure 302 may include heating elements for annealing each non-volatile-memory element 123, a row of non-volatile memory elements 123, a column of non-volatile memory elements 123, or the like. In another embodiment, each non-volatile memory element 123 may include a separate heating element. Because thermal annealing may cause data loss, data may be moved from a non-volatile memory elements 123 that is scheduled for annealing to another non-volatile memory element 123 within the enclosure. However, in some embodiments, the heat from annealing a non-volatile memory element 123 may raise the temperature of one or more nearby non-volatile memory elements 123, which still store data. Overheating may cause data errors in nearby non-volatile memory elements 123. Thus, in certain embodiments, heat shields or cooling elements may be provided on each non-volatile memory element 123, within the enclosure between sets of non-volatile memory elements 123, or the like, to prevent overheating, so that data errors are mitigated or reduced.

Additionally, in some embodiments, the enclosure 302 may include insulation, a heat shield, cooling devices, heat sinks, fans, or the like, that exhaust heat from annealing non-volatile memory elements 123 away from the enclosure, to avoid heat damage for nearby devices. For example, in one embodiment, the enclosure 302 may be a rack-mountable device, and may include cooling fans that direct airflow through the enclosure from front to back (e.g., from a cold aisle to a hot aisle of a data center), and insulation at the top and/or bottom of the enclosure 302 to protect other devices mounted in the same rack as the enclosure 302 from overheating.

Figure 4:
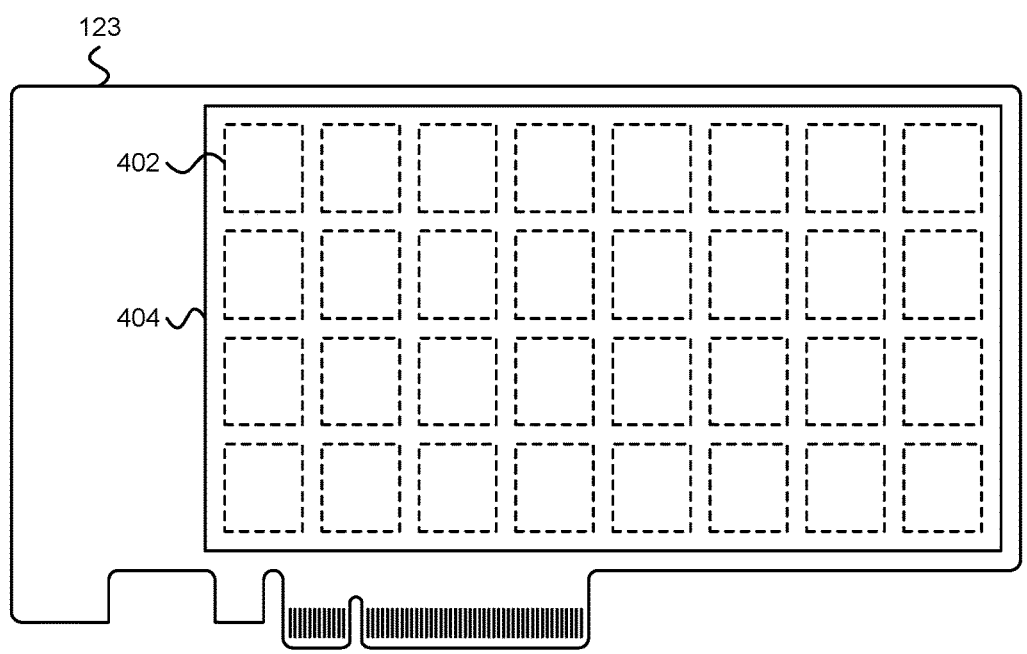
FIG. 4 is a top view illustrating one embodiment of a non-volatile memory element comprising a heating element.

FIG. 4 depicts one embodiment of a non-volatile memory element 123 comprising a heating element 404. In one embodiment, the non-volatile memory element 123 may be substantially similar to the non-volatile memory elements 123 described above with regard to FIGS. 1 through 3. In the depicted embodiments, the non-volatile memory element 123 is a PCIe card including a plurality of chip packages 402. In another embodiment, the non-volatile memory element 123 may be another type of expansion card, a solid-state drive in a traditional hard drive form factor, a single chip package 402, or a die plane, die, or chip within a chip package 402.

In certain embodiments, a chip package 402 may include one or more chips, which may be substantially similar to the chip 212 described above with regard to FIG. 2, dies, die planes, or the like. Thus, a chip package 402 may include one or more arrays of non-volatile memory cells, such as NAND flash memory cells, ReRAM memory cells, or the like. A non-volatile memory element 123 may include one or more chip packages 402, or one or more dies, die planes, or chips within chip packages 402. In one embodiment, a system for annealing non-volatile memory may include an array of one or more non-volatile memory elements 123, and heating element(s) 404 for annealing one or more of the non-volatile memory elements 123. In another embodiment, an apparatus or system for annealing non-volatile memory may include heating element(s) 404 without non-volatile memory elements 123, and may be installed in conjunction with separately-obtained non-volatile memory elements 123.

In the depicted embodiment, a non-volatile memory element 123 is an expansion card, and an array of non-volatile memory elements 123 may include an array or plurality of expansion cards 123, as described above with regard to the enclosure 302 of FIG. 3. In another embodiment, a non-volatile memory element 123 may be a chip package 402, and an array of non-volatile memory elements 123 may include a row, column, or other set of chip packages 402. Different types of arrays of non-volatile memory elements 123 will be clear in view of this disclosure.

In one embodiment, an apparatus for annealing non-volatile memory may include a heating element 404 for annealing one or more of the non-volatile memory elements 123. For example, in a certain embodiment, a resistive heating element 404 may produce heat to anneal a non-volatile memory element 123. In various embodiments, "annealing" a non-volatile memory element 123 may refer to any process that raises the non-volatile memory element 123 to temperatures above a normal operating temperature, for the purpose of reversing damage, healing or reducing defects, or otherwise improving the longevity and/or endurance of the annealed non-volatile memory element 123. Heating elements for annealing are described in further detail below with regard to FIGS. 5A-5B.

In various embodiments, a heating element 404 may be attached to the top of a chip package 402 for a non-volatile storage die, or adjacent to a chip package 402 for a non-volatile storage die. With reference to a chip package 402 or a non-volatile memory element 123, directional language such as "top," "adjacent to," or the like refers to an orientation in which a substrate (e.g., a printed circuit board for a non-volatile memory element 123) is below the chip package 402. Directional language is not intended to imply absolute relationships; for example, a heating element 404 attached to the "top" of a chip package 402 may be moved to be actually underneath a chip package 402 simply by turning the non-volatile memory element 123 over. Nevertheless, the relative relationship between the chip package 402 and the heating element 404 is unchanged.

In the embodiment depicted in FIG. 4, the heating element 404 is attached to the top of the chip packages 402. Attaching a heating element 404 above a plurality of chip packages 402 may provide good thermal contact between the heating element 404 and each chip package 402, but may increase the height of the non-volatile memory element 123 (e.g., expansion card) that includes the chip packages.

In certain embodiments, height constraints, such as the spacing between non-volatile memory elements 123 in the enclosure 302 of FIG. 3, may not provide clearance for a heating element 404 attached to the top of chip packages 402 (e.g., between non-volatile memory elements 123 in expansion card form). Thus, in certain embodiments, a heating element 404 may be disposed adjacent to, rather than on top of, chip packages 402. For example, in one embodiment, a heating element 404 may be attached to a printed circuit board for the non-volatile memory element 123, adjacent to the chip packages 402. In certain embodiments, a heating element 404 disposed adjacent to a row of chip packages 402 may be smaller than a heating element 404 attached to the top of chip packages 402, or less effective at heating more distant chip packages 402 which the heating element 404 does not directly contact, but may fit within height constraints for a non-volatile memory element 123. In another embodiment, a heating element 404 may include a plurality of distributed components, such as heating resistors disposed within individual chip packages 402. Many further configurations of heating elements 404 in relation to chip packages 402 will be clear in vies of this disclosure.

Figure 5A:
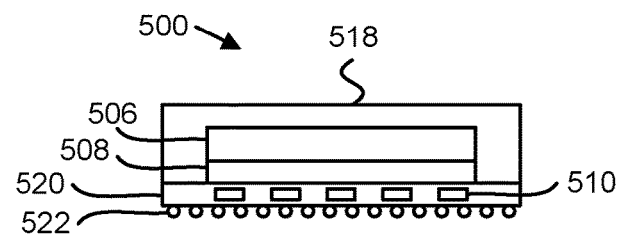
FIG. 5A is a side cross-section view illustrating one embodiment of heating elements in relation to a chip package.

FIG. 5A depicts one embodiment of heating elements in relation to a chip package 500. The chip package 500 may be substantially similar to the chip package 402 described above with regard to FIG. 4. In one embodiment, a chip package 500 may include a die 506, a die attach material 508, a substrate 520, a ball grid array 522, and a mold compound 518. The die 506 may include an array of non-volatile storage cells, and may, in some embodiments, be substantially similar to the die 212 described above with regard to FIG. 2. Although one die 506 is depicted in FIG. 5A, a chip package 500 in another embodiment may include a plurality of dies 506.

The substrate 520 may include a printed circuit board or other material that supports the die 506 and provides electrical connections between the die 506 and the ball grid array 522. The die attach material 508 may include solder, a eutectic mixture, epoxy, or the like, that bonds the die 506 to the substrate 520. The ball grid array 522 may include solder balls for surface-mount attachment of the chip package 500. The mold compound 518 may be a resin or other material that protects the die 506. In various embodiments, chip packages 500 may include various alternative or additional elements, such as ceramic packages, packages with pins for through-hole mounting, or the like. Many types of chip packages 500 for non-volatile memory media will be clear in view of this disclosure.

In the depicted embodiment, the chip package 500 includes one or more resistors 510 disposed within the chip package 500, within the substrate 520. In another embodiment, heating resistors may be embedded between the substrate 520 and the non-volatile storage die 506 (e.g., within the die attach material 508), rather than within the substrate. In yet another embodiment, heating resistors 510 may be disposed within the chip package 500, to the side of the die 506. In a certain embodiment, a heating element for annealing a non-volatile memory element or set of non-volatile memory elements that includes the chip package 500 may include the resistors 510.

In general, in various embodiments, disposing heating resistors 510 within the chip package 500 may provide close thermal contact between the resistors 510 and the die 506, and may prevent excessive amounts of heat from being transferred to components other than the die 506. In some embodiments, disposing resistors 510 within a chip package 500, whether underneath the die 506, to the side of the die 506, within the die attach material 508, within the substrate 520, or the like, may allow a heating element including the resistors 510 to heat one or more non-volatile memory elements by directly heating chip packages 500, so that other components, such as further electronics within an annealed non-volatile memory element, or a non-annealed non-volatile memory element, are heated only indirectly. Various further configurations of heating resistors 510 and chip packages 500 will be clear in view of this disclosure.

In a further embodiment, a chip package 500 may be directly heated without dedicated heating resistors, by driving high currents through word lines or bit lines to heat a die 506. In another embodiment, a chip package may be heated using any combination of heating resistors, separate heating elements as depicted in FIG. 5B, high current drivers for word lines and/or bit lines, or the like.

Figure 5B:
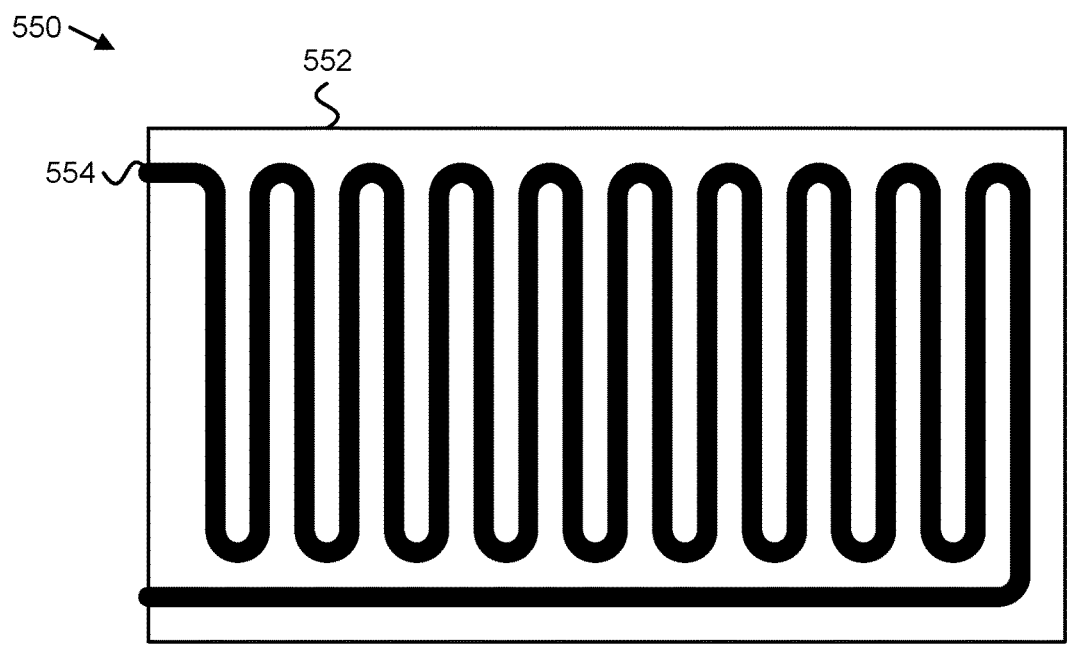
FIG. 5B is a top view illustrating one embodiment of a heating element.

FIG. 5B depicts one embodiment of a heating element 550. In general, in various embodiments, the heating element 550 is configured to heat one or more non-volatile memory elements to anneal the non-volatile memory element(s). For example, in one embodiment, a resistive heating element 550 may produce heat to anneal a non-volatile memory element.

In the depicted embodiment, the heating element 550 includes a substrate 552 and a line metal heater 554. In one embodiment, the line metal heater 554 is a resistive metal heater, which produces heat in response to an electrical current. Although the heating element 550 includes a line metal heater 554 in the depicted embodiment, a heating element 550 in another embodiment may include a ceramic, polymer, composite or other material that produces heat in response to an electrical current. In various embodiments, a "line" metal heater 554 may refer to a metal heater through which current moves from one end of a "line" to the other, even if the line is curved, coiled, serpentine, or otherwise not actually in the form of a straight line. A line metal heater 554 may include a resistive wire, etched foil, a deposited metal film, or the like.

In another embodiment, a heating element 550 may heat non-volatile memory elements other than by resistive electrical heating. For example, in various embodiments, a heating element may include a heat pump that circulates a heated liquid through a metal plate, a thermoelectric heating element, or the like. Many types of electric and other heating elements will be clear in view of this disclosure.

In the depicted embodiment, the line metal heater 554 is bonded or otherwise attached to a substrate 552. The substrate 552 may support and/or protect the metal heater 554. In one embodiment, the substrate 552 may be a printed circuit board. In a certain embodiment, the substrate 552 may be configured to have certain thermal properties. For example, in one embodiment, the substrate 552 may be coupled to a set of non-volatile memory elements to be annealed, and may be configured to transfer heat from the line metal heater 554 to the non-volatile memory elements. In another embodiment, the line metal heater 554 may be between the non-volatile memory elements and the substrate 552, and the substrate may be configured to block heat transfer away from the non-volatile memory elements that are being annealed, reflect heat back to the non-volatile memory elements that are being annealed, or the like.

In certain embodiments, an apparatus for annealing non-volatile memory may include multiple heating elements 550. For example, in one embodiment, an apparatus for annealing non-volatile memory may include a heating element 550 for heating a first set of non-volatile memory elements, and an additional heating element for annealing the second set of non-volatile memory elements. In another embodiment, separate heating elements 550 may be provided for each chip package. Various configurations of heating elements 550 for annealing portions or sets of non-volatile memory elements will be clear in view of this disclosure.

Figure 6:
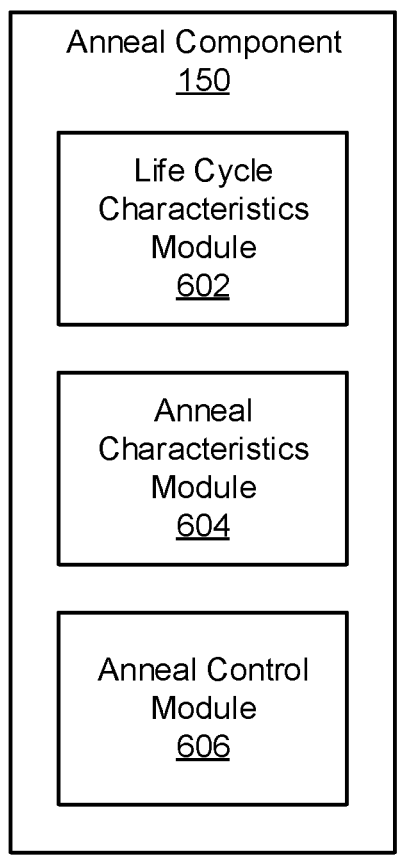
FIG. 6 is a schematic block diagram illustrating one embodiment of an anneal component.

FIG. 6 depicts one embodiment of an anneal component 150. The anneal component 150 may be substantially similar to the anneal component 150 described above with regard to FIGS. 1 and 2, and may include one or more heating elements as described above with regard to FIGS. 5A-5B.

In general, as described, the anneal component 150 identifies one or more life cycle characteristics of a non-volatile memory element, determines or selects a set of anneal characteristics (including anneal duration and/or anneal temperature) for the non-volatile memory element based on the one or more life cycle characteristics, and anneals the non-volatile memory elements using the set of anneal characteristics. In the depicted embodiment, the anneal component 150 includes a life cycle characteristics module 602, an anneal characteristics module 604, and an anneal control module 606.

In certain embodiments, a controller such as the non-volatile memory media controller 126, die controller 220, or the like may include the life cycle characteristics module 602, the anneal characteristics module 604, the anneal control module 606, and/or additional modules described below with regard to FIG. 7. In one embodiment, the controller may include a hardware controller, such as non-volatile memory media controller 126, for a storage device that includes one or more non-volatile memory elements 123 operated on by the anneal component 150. In another embodiment, the controller may include a device driver for a storage-device that includes one or more non-volatile memory elements 123 operated on by the anneal component 150. In a further embodiment, the device driver may include logic hardware and/or executable code stored on one or more computer readable storage media.

The life cycle characteristics module 602, in one embodiment, identifies or determines one or more life cycle characteristics of a non-volatile memory element. In general, in various embodiments, a "life cycle characteristic" may refer to any characteristic, metric, indication, or the like, that corresponds in any way to age, wear, reliability or other changes that might occur over the useful life of a non-volatile memory element. For example, in one embodiment, life cycle characteristics may include a number of previous anneals, an age (e.g., chronological time since first use, time in operation, or the like), a program/erase count, a failed bit count, an error rate, a reliability metric, or the like for the non-volatile memory element. In a certain embodiment, a life cycle characteristic may include a pattern of use for a non-volatile memory element. In certain embodiments, life cycle characteristics may correspond to an amount of damage accumulated due to repeated writing and erasing of a non-volatile memory element, a difficulty of reversing or healing certain types of damage, or the like. Thus, basing anneal characteristics such as temperature and duration on life cycle characteristics may allow an anneal component 150 to provide dynamic, customized annealing for non-volatile memory elements.

In one embodiment the life cycle characteristics module 602 may identify or determine a life cycle characteristic by referencing information tracked by a non-volatile memory element, a device, or the like. For example, in one embodiment, a non-volatile memory element may have an interface that allows the life cycle characteristics module 602 to look up statistics for the non-volatile memory element such as a program/erase cycle count, or the like. In another embodiment the life cycle characteristics module 602 may identify or determine a life cycle characteristic by actively tracking information. For example, in one embodiment, a life cycle characteristics module 602 may actively monitor error rates, patterns of use, or the like.

In a certain embodiment, the one or more life cycle characteristics determined by the life cycle characteristics module 602 may include a pattern of use. A pattern of use may include any information suggesting that use of a non-volatile memory element conforms to a repeated, regular, or intelligible form, sequence, or model. For example, in one embodiment, a pattern of use may simply include a program/erase cycle count indicating whether a non-volatile memory element is lightly or heavily used. In a further embodiment, a pattern of use may include more a sophisticated pattern. For example, a pattern of use may indicate that a non-volatile memory element is idle on weekends, and an anneal component 150 may accommodate that pattern of use by annealing the non-volatile memory element on a weekend. In certain embodiments, more sophisticated patterns of use, such as when the non-volatile memory element is more heavily or more lightly used, what kind of data or application the non-volatile memory element is typically used for, or the like, may go beyond statistics (such as program/erase cycle counts) tracked by the non-volatile memory element itself. Thus, in a certain embodiment, a pattern of use may be identified by a driver operating on a host, where the driver monitors data flow between the host and the non-volatile memory element. The life cycle characteristics module 602 may include the driver, or a component of the driver, in certain embodiments. Using a driver to monitor data flow may allow the life cycle characteristics module 602 to track and monitor patterns of use that it could not determine by querying a non-volatile memory element itself.

In one embodiment, the life cycle characteristics module 602 may track or determine life cycle characteristics separately for individual non-volatile memory elements. In another embodiment, the life cycle characteristics module 602 may track life cycle characteristics together for multiple non-volatile memory elements (e.g., at a rougher granularity). For example, each non-volatile memory element may have an individually-tracked error rate, but an age may be tracked at the device level, so that an age for an individual non-volatile memory element is simply the age of the device. Various levels of granularity appropriate for tracking life cycle characteristics will be clear in view of this disclosure.

The anneal characteristics module 604, in one embodiment, selects or determines a set of anneal characteristics based on the one or more life cycle characteristics identified by the life cycle characteristics module 602. Selecting anneal characteristics based on life cycle characteristics for a non-volatile memory element may allow an anneal to be customized for the life cycle of the non-volatile memory element, for an expected amount of damage at a particular point in the life cycle of the non-volatile memory element, or the like.

In various embodiments, an anneal characteristic may include any characteristic, factor, variable, or the like, for annealing a non-volatile memory element. A set of anneal characteristics may refer to one or more anneal characteristics. For example, in one embodiment, the set of anneal characteristics determined by the anneal characteristics module 604 may include an anneal duration and/or an anneal temperature for annealing a non-volatile memory element. In further embodiment further anneal characteristics may include a time for starting an anneal, a sequence of anneal steps with different temperatures (and possibly different durations), a power level for a heating element, or the like.

In one embodiment, the anneal characteristics module 604 may determine or select an anneal duration based on the one or more life cycle characteristics identified by the life cycle characteristics module 602. An anneal duration may refer to a time between starting and ending an anneal for a non-volatile memory element, a time at a particular temperature for annealing a non-volatile memory element (excluding time heating to or cooling from the anneal temperature), a number of clock cycles, or the like. Many types of anneal duration that could be selected by an anneal characteristics module 604 will be clear in view of this disclosure.

In a further embodiment, the anneal characteristics module 604 may determine or select an anneal temperature based on the one or more life cycle characteristics identified by the life cycle characteristics module 602. An anneal temperature may refer to any measurement that corresponds to a temperature for annealing a non-volatile memory element. For example, in one embodiment, an anneal temperature may be an actual temperature in degrees Celsius, degrees Fahrenheit, Kelvin, or the like. In another embodiment, an anneal "temperature" may be a power level for a heating element, a voltage level, a current level, or the like, where a higher power level corresponds to a higher actual temperature. Many types of anneal temperature that could be selected by an anneal characteristics module 604 will be clear in view of this disclosure.

In one embodiment, the anneal characteristics module 604 may determine or select a set of anneal characteristics by referencing a predetermined correspondence between anneal characteristics and life cycle characteristics. A correspondence between anneal characteristics and life cycle characteristics may be predetermined based on anneal performance of another non-volatile memory element (e.g. a similar non-volatile memory element in the same device, a non-volatile memory element in another device, or the like). In some embodiments, referencing a predetermined correspondence may include looking up anneal characteristics in a lookup table ordered or indexed by life cycle characteristics, or the like For example, in one embodiment, a manufacturer of a certain type or model of non-volatile memory element may precharacterize the non-volatile memory element by repeated writing and erasing to take non-volatile memory elements to different points in their life cycle, and by annealing using different times, temperatures, or the like, to determine suitable anneal characteristics at different points in the life cycle of the non-volatile memory element. Certain anneal characteristics may then be stored in correspondence (e.g., in a table, mapping, or the like) with life cycle characteristics, and the anneal characteristics module 604 may select anneal characteristics from the table or mapping based on life cycle characteristics.

In another embodiment, the anneal characteristics module 604 may determine or select a set of anneal characteristics based on results of one or more previous anneals for a non-volatile memory element. In various embodiments, "results" of a previous anneal may refer to any measurement or indication of the effectiveness of a previous anneal. For example, in one embodiment, results of a previous anneal may include a time, a number of program/erase cycles, or the like, between a previous anneal and reaching an error rate threshold that suggests that a further anneal would be useful. In another embodiment, results of a previous anneal may include a difference in error rates before and after the previous anneal. Various types of results that measure or indicate the effectiveness of a previous anneal will be clear in view of this disclosure.

In various embodiments, the anneal characteristics module 604 may base anneal characteristics on results of one or more previous anneals in various ways. For example, if results of previous anneals indicate a high level of effectiveness, the anneal characteristics module 604 may select the same anneal characteristics that were used for previous anneals, or may reduce an anneal temperature and/or duration, to see if a similarly (or sufficiently) effective anneal may be accomplished with lower power usage. Conversely, in another embodiment, if results of previous anneals indicate low or diminishing effectiveness, the anneal characteristics module 604 may increase an anneal temperature and/or duration. In general, in various embodiments, basing anneal characteristics on results of previous anneals allows the anneal characteristics module 604 to dynamically modify anneal characteristics throughout the life of a non-volatile memory element, to improve endurance gain or longevity in contrast to annealing with fixed or predetermined temperatures and/or durations.

In one embodiment, the anneal characteristics module 604 may increase the anneal temperature and/or the anneal duration for successive anneals of a non-volatile memory element. For example, in one embodiment, the anneal characteristics module 604 may increase anneal temperatures while reducing anneal durations for subsequent anneals. In another embodiment, the anneal characteristics module 604 may maintain anneal temperatures while increasing anneal durations for subsequent anneals. In general, increasing the temperature and/or the duration for an anneal may reverse or heal damage that was not reversed by a previous, lower-temperature or lower-duration anneal.

In a certain embodiment, the anneal characteristics module 604 may use anneal durations that correspond to anneal temperatures such that a reduced anneal duration corresponds to an increased anneal temperature. For example, in one embodiment, the anneal characteristics module 604 may select a higher temperature and a lower duration than in a previous anneal. In another embodiment, the anneal characteristics module 604 may select a lower temperature and a higher duration than in a previous anneal. In general, lower anneal temperatures may reverse damage more slowly, thus longer durations may facilitate reversing damage when annealing at lower temperatures. Conversely, higher anneal temperatures may reverse damage more quickly, thus shorter durations may be sufficient for annealing at higher temperatures.

In one embodiment, an annealing temperature or duration may be selected by the anneal characteristics module 604 based on one or more life cycle characteristics and based on a desired improvement to the annealed non-volatile memory elements 123. In a certain embodiment, an annealing temperature or duration may be selected based on a heat tolerance of other components, such as a temperature rating of electronic components in proximity to the annealed set of non-volatile memory elements 123, a solder melting point, rates of data errors at various temperatures for other non-volatile memory elements 123, or the like. In one embodiment, an anneal temperature may be selected from a range, from approximately 150 degrees Celsius to 250 degrees Celsius. In another embodiment, an anneal temperature may be approximately 170 to 175 degrees Celsius. Various ways of selecting anneal temperatures and durations will be clear in view of this disclosure.

The anneal control module 606, in one embodiment, anneals one or more non-volatile memory elements using the selected anneal characteristics (e.g., anneal duration and anneal temperature) from the anneal characteristics module 604. For example, in one embodiment, the anneal control module 606 may control one or more heating elements to anneal a selected non-volatile memory element for the determined anneal duration and anneal temperature.

In certain embodiments, the anneal control module 606 may manage or control temperatures of non-volatile memory elements, or sets of non-volatile memory elements, to anneal non-volatile memory. In a certain embodiment, the anneal control module 606 may include or be in communication with one or more heating elements as described above. For example, in one embodiment, a controller including an anneal control module 606 may activate a heating element to anneal a first set of non-volatile memory elements In a certain embodiment, the anneal control module 606 may include or be in communication with hardware for activating heating elements, such as high-power transistors for switching current to heating elements, charge pumps for driving high currents through word lines or bit lines, or the like. In a further embodiment, the anneal control module 606 may include or be in communication with hardware for measuring temperature, such as one or more thermocouples, thermistors, or the like, and may be configured to control or manage heating and/or cooling based on a measured temperature. In certain embodiments, the anneal control module 606 may include or be in communication with hardware for measuring anneal duration, such as an oscillator that generates a clock signal, or the like.

Figure 7:
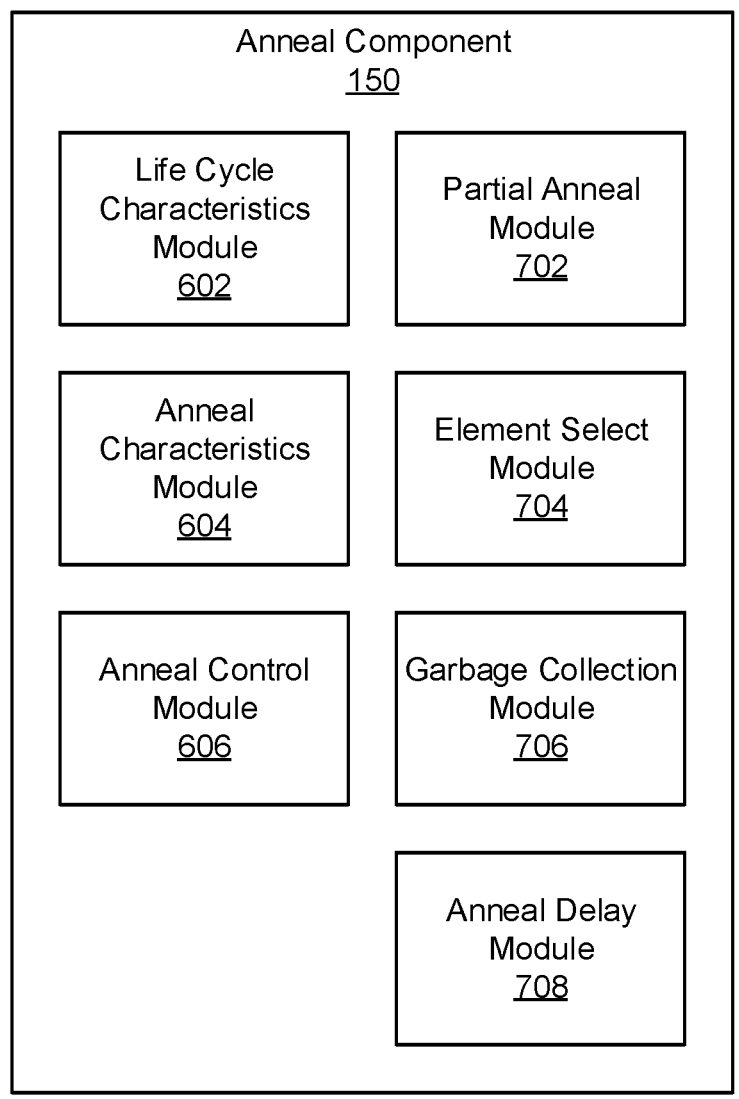
FIG. 7 is a schematic block diagram illustrating a further embodiment of an anneal component.

FIG. 7 depicts a further embodiment of an anneal component 150. The anneal component 150, in certain embodiments, may be substantially similar to the anneal component 150 described above with regard to FIGS. 1, 2, and/or 6. In the depicted embodiment, the anneal component 150 includes a life cycle characteristics module 602, an anneal characteristics module 604, and an anneal control module 606, which may be configured substantially as described above with regard to FIG. 6. The anneal component 150, in the depicted embodiment, includes a partial anneal module 702, an element select module 704, a garbage collection module 706, and an anneal delay module 708.

The partial anneal module 702, in one embodiment, determines whether to perform a partial anneal or a full anneal for a non-volatile memory element. In certain embodiments, the anneal characteristics module 604 may cooperate with the partial anneal module 702 so that selecting or determining a set of anneal characteristics (e.g., an anneal duration and/or an anneal temperature) includes determining whether to perform one of a partial anneal and a full anneal for the non-volatile memory element. For example, in one embodiment, the partial anneal module 702 may determine to perform a partial anneal for a non-volatile memory element, and the anneal characteristics module 604 may select an anneal temperature and duration for a partial anneal. In another embodiment, the partial anneal module 702 may determine to perform a full anneal for a non-volatile memory element, and the anneal characteristics module 604 may select an anneal temperature and duration for a full anneal In general, in various embodiments, a "full" anneal may refer to an anneal with anneal characteristics selected to reverse or heal damage as far as may practically be achieved given the life cycle characteristics of a non-volatile memory element. For example, in one embodiment, a "full" anneal may return a non-volatile memory element to approximately its original state, reversing any damage that has accumulated over time. In another embodiment, annealing a non-volatile memory element may heal or reverse some damage, but irreversible (or impractically reversible) damage may also accumulate over time, which is not reversed even by repeated annealing, and a "full" anneal may reverse or heal a substantial amount of damage, even if repeated full anneals provide diminishing returns.

By contrast, in various embodiments, a partial anneal may refer to an anneal with anneal characteristics selected to provide a lesser benefit than a full anneal. For example, a partial anneal may have a lower temperature or a shorter duration than a full anneal, and may reverse less damage to a non-volatile medium. In some embodiments, whether an anneal is a partial anneal or a full anneal may depend on life cycle characteristics of a non-volatile memory element. For example, anneal characteristics that provide a full anneal early in the life cycle of a non-volatile memory element may only provide a partial anneal later in the life cycle of the non-volatile memory element.

In some embodiments, although a full anneal may be preferable for healing damage, a partial anneal may be preferable from the standpoint of energy use, cooling requirements, time out of operation, or the like. Thus, in certain embodiments, the partial anneal module 702 may determine whether to perform a partial anneal or a full anneal. For example, in one embodiment, a partial anneal module 702 may determine to perform a full anneal based on a high error rate. In another embodiment, the partial anneal module 702 may determine to perform a partial anneal based on a low amount of available time for taking a non-volatile memory element out of operation for annealing. In one embodiment, the partial anneal module 702 may select partial anneals early in the life cycle of a non-volatile memory element, and may select full anneals later in the life cycle of the non-volatile memory element. Various reasons for selecting a partial anneal or a full anneal will be clear in view of this disclosure.

The element select module 704, in one embodiment, selects a non-volatile memory element for annealing, from the array of non-volatile memory elements, based on one or more life cycle characteristics determined by the life cycle characteristics module 602 for the selected non-volatile memory element.

For example, in one embodiment, the element select module 704 may select a non-volatile memory element for annealing based on one or more life cycle characteristics that trigger annealing. In certain embodiments, the element select module 704 may select a non-volatile memory element for annealing based on any event, measurement, indication, or the like, that corresponds, directly or indirectly, to damage that may be reduced or errors that may be improved by annealing. For example, in various embodiments, the element select module 704 may select a non-volatile memory element for annealing based on a chronological age, a time in operation, a program/erase cycle count, a reliability metric, an error rate, or the like for a non-volatile memory element. In further embodiments, the element select module 704 may select a non-volatile memory element for annealing based on one or more metrics such as an age, time in operation, program/erase cycle count, reliability metric, error rate, or the like satisfying a threshold for annealing a non-volatile memory element. In response to a metric satisfying a threshold or another event that triggers annealing, the element select module 704 may select a non-volatile memory element for annealing, schedule annealing, communicate with a controller to prepare a non-volatile memory element for annealing, or the like.

The garbage collection module 706, in one embodiment, performs a garbage collection operation that moves valid data off of the non-volatile memory element. In general, in various embodiments, the garbage collection module 706 may perform normal garbage collection, grooming, or wear leveling for one or more non-volatile memory elements by moving valid data. In certain embodiments, a block or other unit of non-volatile memory may include valid data and/or invalid data. Invalid data may refer to data that that is no longer in use, but not yet erased. For example, in one embodiment, multiple pages of valid data may be written to a block of non-volatile memory. In certain embodiments, the pages of a block are simultaneously erasable, but pages may not be individually erasable without erasing the rest of the block. Thus, when a page in a block is updated, the updated page may be written to a new location, and the old page may be marked as invalid. A block with no valid data (e.g., with only invalid or empty pages) may be erased and reclaimed. In general, a garbage collection operation may move valid data off of a block by copying the valid data to a new block and/or marking the data in the old block as invalid. A garbage collection module 706 may move valid data off a block to consolidate valid data from multiple blocks into one block, so that the first blocks can be erased and reused, or may move data from one block to another block for wear leveling or the like.

In certain embodiments, temperatures sufficient to heal trap sites in the tunnel oxide layer of flash memory may also provide enough thermal energy for charge carriers to escape storage cells (e.g., floating gates), causing changes in stored data values. Other types of non-volatile memory media that store data in other ways may similarly be annealed to reverse damage at temperatures that also affect a physical property that encodes data. Thus, in certain embodiments, data is preserved by moving valid data off of a non-volatile memory element prior to annealing the non-volatile storage element. In one embodiment, data may simply be moved or copied from one non-volatile memory element to another non-volatile memory element in bulk before annealing. In another embodiment, however, a garbage collection module 706 may move valid data off of a non-volatile memory element for annealing (e.g., by gradually moving individual pages during garbage collection or wear leveling).

In some embodiments, a garbage collection module 706 may normally perform garbage collection operations that move valid data from one block of non-volatile memory to another block. Thus, in further embodiments, the garbage collection module 706 may move valid data off of a non-volatile memory element by copying the valid data to a block on another non-volatile memory element. In a certain embodiment, the garbage collection module 706 may perform a garbage collection operation that moves valid data off of a non-volatile memory element (e.g., a non-volatile memory element selected for annealing by the element select module 704) in response to determining that a time remaining before annealing the non-volatile memory element satisfies a threshold. For example, in one embodiment, a non-volatile memory element may be scheduled for annealing, so that the time remaining before annealing is gradually decreasing. As the scheduled time approaches, the remaining time may satisfy a threshold by being equal or less than a threshold time. In response to the remaining time satisfying the threshold, the garbage collection module 706 may perform a garbage collection operation that moves valid data off of a non-volatile memory element.

In one embodiment, the garbage collection module 706 may move valid data in the course of normal garbage collection, wear leveling, and the like, for multiple non-volatile memory elements, but may preferentially move valid data off of a non-volatile memory element selected for annealing (e.g., in preference to garbage collection operations for other non-volatile memory elements) in response to the remaining time before annealing satisfying the threshold. In another embodiment, the garbage collection module 706 may accelerate garbage collection operations for the selected non-volatile memory element based on the remaining time. Performing preferential or accelerated garbage collection operations may, in various embodiments, allow a non-volatile memory element to be prepared for annealing by gradual garbage collection, while avoiding delays associated with copying large amounts of data immediately before annealing.

In a certain embodiment, the garbage collection module 706 may perform a garbage collection operation that moves data off of a non-volatile memory element in preparation for annealing, in response to the time remaining before annealing satisfying a threshold based on a time to move remaining valid data off of the non-volatile storage element. For example, in one embodiment, a threshold time may be longer for a non-volatile memory element that stores a larger amount of valid data, and shorter for a non-volatile memory element that stores a smaller amount of valid data. Because moving valid data off of a non-volatile memory element affects the amount of remaining valid data (e.g., by erasing the old data, marking it as invalid, or the like) the time to move remaining valid data off of the non-volatile storage element may change as garbage collection operations are performed. Thus, in certain embodiments, the garbage collection module 706 may determine a time threshold for each garbage collection operation, depending on a current amount of remaining valid data.

In some embodiments, merely prioritizing garbage collection as a scheduled time for annealing approaches may provide some benefit. However, in certain embodiments performing garbage collection based on both the remaining time and the amount or remaining valid data may allow the garbage collection module 706 to flexibly prioritize garbage collection for a non-volatile memory element as the time for annealing the non-volatile memory element approaches, but return to garbage collection for other non-volatile memory elements if enough valid data (relative to the remaining time) has been moved off of the non-volatile memory element scheduled for annealing.

In one embodiment the garbage collection module 706 may determine that the remaining time before annealing satisfies the threshold in response to determining that the remaining time before annealing does not exceed the time to move remaining valid data off of the non-volatile memory element, plus a predetermined margin. For example, if the remaining time before annealing is $\mu$, the number of valid pages on a non-volatile memory element is $\alpha$, and the time to perform a garbage collection operation for a page is $\tau$, then the time to move remaining valid data off the non-volatile memory element is $\alpha\tau$. If $\mu<\alpha\tau$, then there is not enough time remaining before annealing to move valid data, and annealing should be delayed at least long enough to copy valid data before annealing the non-volatile memory element. If $\mu=\alpha\tau$, then there is just enough time remaining before annealing to move valid data. However, moving all remaining valid data immediately before annealing may cause noticeable delays in servicing storage requests for other non-volatile memory elements. Thus, in a certain embodiment, the garbage collection module 706 may perform garbage collection operations to maintain a condition where $\mu>\alpha\tau$. In certain embodiments, $\mu$ may decrease continually as a scheduled anneal time approaches, and $\alpha$ may decrease in steps when the garbage collection module 706 moves or recycles a page of valid data. Thus, in certain embodiments, the garbage collection module 706 may switch back and forth between normal and preferential (or accelerated) garbage collection operations in response to changes in both $\mu$ and $\alpha$.

In one embodiment, if $\mu$ is considerably greater than $\alpha\tau$, then there may be less need to preferentially perform garbage collection operations that move data off of the non-volatile memory element; the time remaining before annealing may be long enough that data would normally be invalidated by deletions, modifications, or normal (non-preferential or non-accelerated) garbage collection operations. Thus, in some embodiments, the garbage collection module 706 may maintain $\mu>\alpha\tau$ by using a predetermined margin of time $\rho$ during which it preferentially performs garbage collection operations that move data off of the non-volatile memory element. If $\mu-\alpha\tau<\rho$, then the garbage collection module 706 may perform garbage collection operations that move data off of the non-volatile memory element until $\mu-\alpha\tau>\rho$, or until no valid data remains. Thus, in certain embodiments, the garbage collection module 706 may determine that the remaining time before annealing (i.e., $\mu$) satisfies the threshold in response to determining that the remaining time before annealing does not exceed the time to move remaining valid data off of the non-volatile memory element, plus a predetermined margin (i.e., $\mu<\alpha\tau+\rho$).

In one embodiment, the predetermined margin $\rho$ may be predetermined by a manufacturer of a non-volatile memory device or non-volatile memory element. In another embodiment, a user or administrator of a non-volatile memory device may set a predetermined margin $\rho$. In one embodiment, a longer predetermined margin $\rho$ may provide garbage collection operations that are spaced out over a larger time, to reduce interference with normal garbage collection and other data operations for other non-volatile memory elements. In another embodiment, a shorter predetermined margin $\rho$ may provide more flexibility in scheduling annealing. Various ways of selecting a predetermined margin $\rho$ will be clear in view of this disclosure.

The anneal delay module 708, in one embodiment, delays annealing a non-volatile memory element in response to determining that an endurance gain for annealing the non-volatile storage element does not exceed write amplification caused by the garbage collection module 706 moving valid data off of the non-volatile storage element. In various embodiments, "write amplification" may refer to any measure of the extent to which data is written, other than in response to a write request. For example, in one embodiment, a garbage collection or wear leveling operation may cause write amplification as valid data is rewritten to another block. In certain embodiments, write amplification may comprise an amount of rewritten data, an amount of program/erase cycles used to rewrite data, a ratio of actual writes to requested writes, or the like.

In various embodiments, an "endurance gain" may refer to an expected gain in longevity for a non-volatile memory element. For example, in certain embodiments, an endurance gain may refer to an expected gain in program/erase cycles, a longevity gain expressed as a percentage of a rated life cycle for a non-annealed non-volatile memory element, or the like. In various embodiments, the anneal delay module 708 may determine an endurance gain for annealing a non-volatile memory element based on one or more anneal characteristics selected by the anneal characteristics module 604 (e.g., an anneal temperature and/or an anneal duration), and/or one or more life cycle characteristics determined by the life cycle characteristics module 602. For example, in certain embodiments, endurance gains for different anneal characteristics at different points in the life cycle of a non-volatile memory element may be precharacterized by experimentation and/or modeling. In a further embodiment, the anneal delay module 708 may determine an endurance gain using a lookup table, mapping or other known correspondence between the endurance gain and an anneal duration, anneal temperature, and/or life cycle characteristics.

In certain embodiments, the anneal delay module 708 may use similar units for write amplification and endurance gain, or may convert units for the sake of comparison. For example, the anneal delay module 708 may determine a write amplification for moving data off a non-volatile memory element in units that indicate an amount of rewritten data, a number of program/erase cycles, a percentage of the rated lifespan of a non-annealed memory element, or the like, associated with preparing for annealing. Similarly, the anneal delay module 708 may determine an endurance gain in units that indicate increased longevity from annealing in terms of an increased amount of data, an increased number of program/erase cycles, a percentage of the rated lifespan of a non-annealed memory element, or the like.

In certain embodiments, if the write amplification caused by moving valid data off of a non-volatile memory element is greater than or equal to the expected endurance gain, than it may be impractical to anneal the non-volatile memory element at the scheduled time: the benefits (e.g., endurance gain) fail to outweigh the costs (e.g., write amplification). However, delaying annealing may reduce write amplification associated with the anneal. For example, in one embodiment, if new data is not written to the non-volatile memory element, the amount of valid data on the non-volatile memory element may decrease over time as modified data is written to other non-volatile memory elements, or as normal wear-leveling operations move valid data. Thus, in certain embodiments, the anneal delay module 708 may delay annealing for a non-volatile memory element until the endurance gain for annealing exceeds the write amplification penalty. The anneal delay module 708 may delay annealing by resetting or extending the time until annealing, temporarily disqualifying the non-volatile memory element from annealing, or the like.

Figures 8A, 8B:
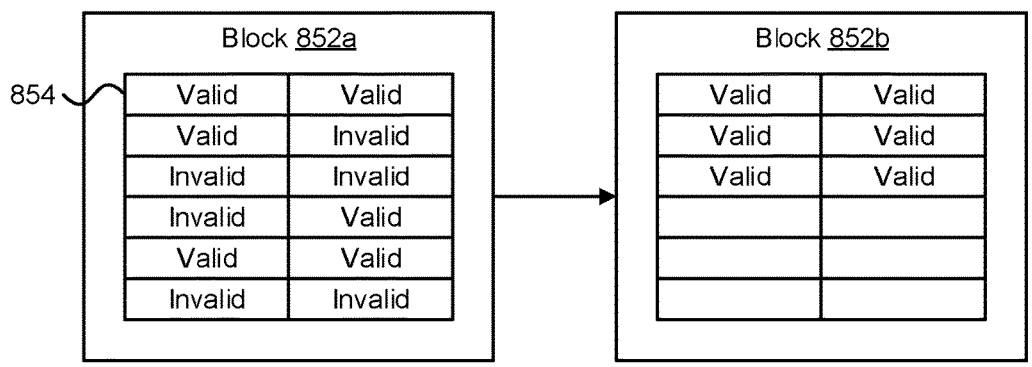
FIG. 8A illustrates a table correlating a life cycle characteristic, anneal characteristics, and an endurance gain for annealing a non-volatile memory element, in one embodiment.
FIG. 8B is a schematic block diagram illustrating one embodiment of a garbage collection operation.

FIG. 8A depicts a lookup table 800 correlating a life cycle characteristic, anneal characteristics, and an endurance gain for annealing a non-volatile memory element, in one embodiment. In the depicted embodiment, the life cycle characteristic is a number of previous anneals 802. Anneal characteristics include an anneal temperature 804 and an anneal duration 806. In certain embodiments, the anneal characteristics module 604 may use a lookup table such as the table 800 to select anneal characteristics based on a life cycle characteristic such as a number of previous anneals 802. Additionally, the table 800 include an endurance gain 808. In the depicted embodiment, the endurance gain 808 is expressed as a percentage of a maximum expected endurance gain. However, in another embodiment, an endurance gain 808 may be expressed in another way. In certain embodiments, the anneal delay module 708 may use a lookup table such as the table 800 to determine an endurance gain 808 based on an anneal temperature 804, anneal duration 806, or one or more life cycle characteristics.

FIG. 8B depicts one embodiment of a garbage collection operation 850. In the depicted embodiment, a block 852a includes multiple pages 854. Each page 854 may be marked as valid or invalid, so the block 852a includes valid and invalid data. The garbage collection operation 850 copies valid pages 854 to a new block 852b. In the depicted embodiment, invalid pages 854 are not copied by the garbage collection operation 850, so the new block 852b includes empty pages, which may be filled by further write operations or garbage collection operations. The original block 852a may be erased, or the valid pages 854 may be marked as invalid. In certain embodiments, a garbage collection module 706 may perform a garbage collection operation 850 to move valid data off a non-volatile memory element scheduled for annealing, by moving valid pages 854 from a first block 852a on the non-volatile memory element scheduled for annealing to a second block 852b on a non-volatile memory element not scheduled for annealing.

Figure 9:
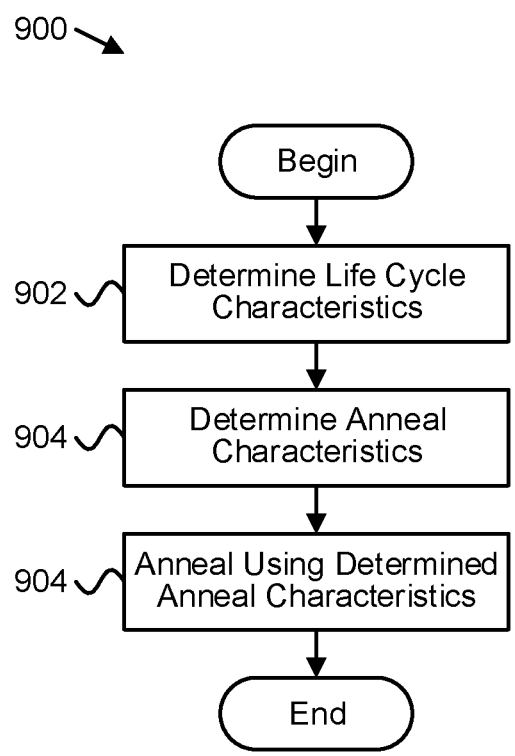
FIG. 9 is a schematic flow chart diagram illustrating one embodiment of a method for annealing non-volatile memory.

FIG. 9 is a schematic flow chart diagram illustrating one embodiment of a method 900 for annealing non-volatile memory. The method 900 begins, and the life cycle characteristics module 602 determines 902 one or more life cycle characteristics of a non-volatile memory element, The anneal characteristics module 604 determines 904 a set of anneal characteristics (including an anneal duration and/or an anneal temperature) for the non-volatile memory element based on the one or more life cycle characteristics. The anneal control module 606 anneals 906 the non-volatile memory element using the determined set of anneal characteristics, and the method 900 ends.

Figure 10:
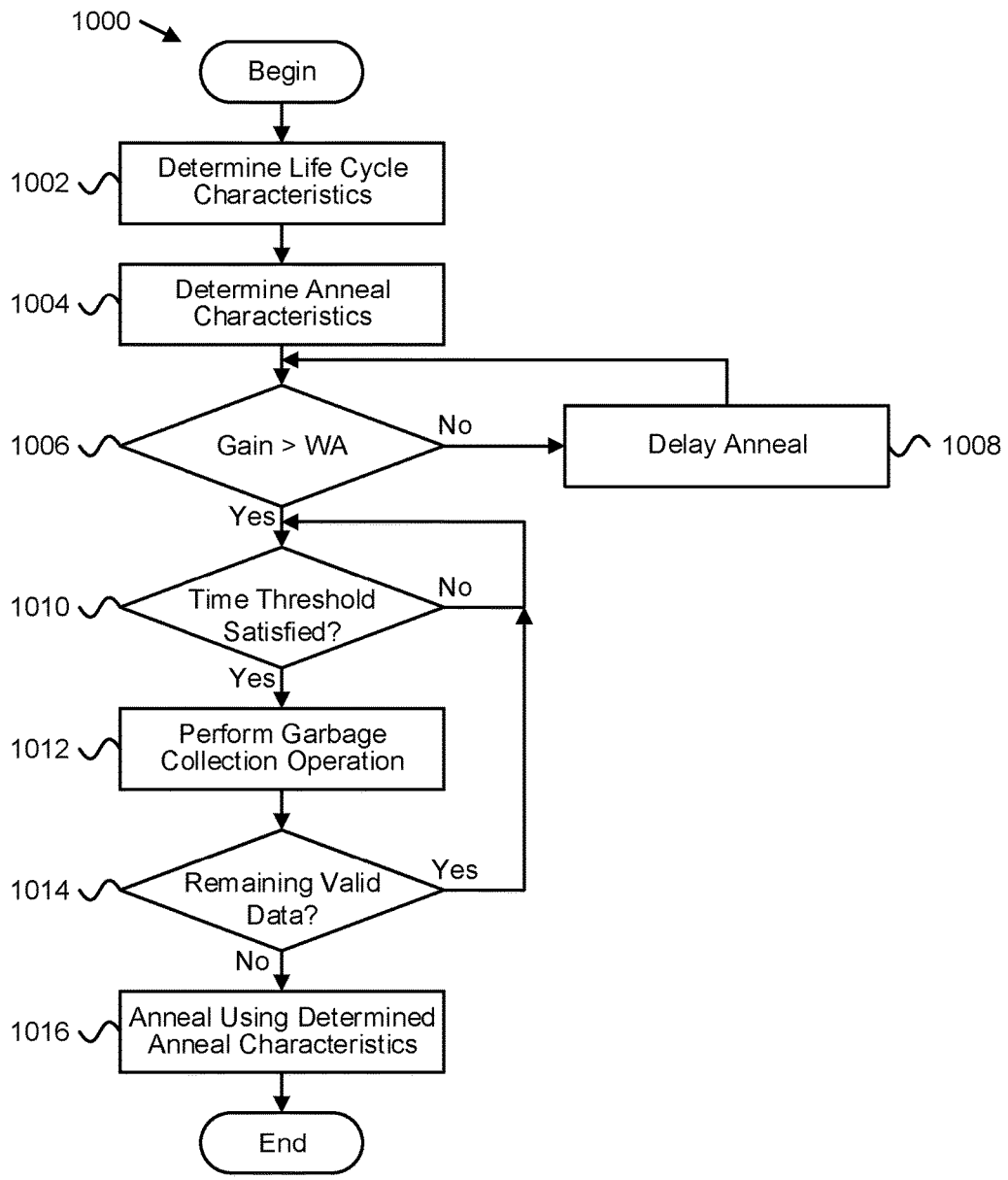
FIG. 10 is a schematic flow chart diagram illustrating a further embodiment of a method for annealing non-volatile memory.

FIG. 10 is a schematic flow chart diagram illustrating one embodiment of a method 1000 for annealing non-volatile memory. The method 1000 begins, and the life cycle characteristics module 602 determines 1002 one or more life cycle characteristics of a non-volatile memory element, The anneal characteristics module 604 determines 1004 a set of anneal characteristics (including an anneal duration and/or an anneal temperature) for the non-volatile memory element based on the one or more life cycle characteristics. The anneal delay module 708 determines 1006 whether an endurance gain for annealing the non-volatile memory element exceeds a write amplification for annealing the non-volatile memory element. If the endurance gain does not exceed the write amplification, the anneal delay module 708 delays 1008 annealing until the endurance gain does exceed the write amplification. The garbage collection module 706 determines 1010 whether a time remaining before annealing the non-volatile memory element satisfies a threshold based on a time to move remaining valid data off of the non-volatile memory element. If the remaining time does not satisfy the threshold, the garbage collection module 706 may periodically re-determine 1010 whether the threshold is satisfied. Once the remaining time satisfies the threshold, the garbage collection module 706 performs 1012 a garbage collection operation. The garbage collection module 706 determines 1014 whether valid data remains on the non-volatile memory element. If valid data remains, the method 1000 continues with the garbage collection module 706 determining 1010 whether a time remaining before annealing the non-volatile memory element satisfies a threshold based on a time to move remaining valid data off of the non-volatile memory element. If no valid data remains, the anneal control module 606 anneals 1016 the non-volatile memory element using the determined set of anneal characteristics, and the method 1000 ends.

A means for identifying one or more life cycle characteristics of a non-volatile storage element, in various embodiments, may include an anneal component 150, a life cycle characteristics module 602, a processor, a die controller, a die state machine, a non-volatile memory media controller, a device driver, other logic hardware, and/or other executable code stored on a computer readable storage medium. Other embodiments may include similar or equivalent means for identifying life cycle characteristics.

A means for selecting anneal characteristics (e.g., temperature and duration) for annealing a non-volatile storage element, in various embodiments, may include an anneal component 150, an anneal characteristics module 604, a processor, a die controller, a die state machine, a non-volatile memory media controller, a device driver, other logic hardware, and/or other executable code stored on a computer readable storage medium. Other embodiments may include similar or equivalent means for selecting anneal characteristics.

A means for annealing a non-volatile storage element, in various embodiments, may include a heating element, a line metal heater, a resistive heating element, a word line, a bit line, a resistor disposed within a chip package, a resistor in thermal communication with a chip package, a voltage source, a charge pump, a thermocouple, a thermistor, a feedback mechanism, an anneal component 150, an anneal control module 606, a processor, a die controller, a die state machine, a non-volatile memory media controller, a device driver, other logic hardware, and/or other executable code stored on a computer readable storage medium. Other embodiments may include similar or equivalent means for annealing non-volatile storage elements.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   determining one or more life cycle characteristics of a non-volatile memory element;
   determining a set of anneal characteristics for the non-volatile memory element, the set of anneal characteristics based on the one or more life cycle characteristics, the set of anneal characteristics comprising one or more of an anneal duration and an anneal temperature; and
   annealing the non-volatile memory element using the set of anneal characteristics.

2. The method of claim 1, wherein determining the set of anneal characteristics comprises referencing a predetermined correspondence between anneal characteristics and life cycle characteristics, the predetermined correspondence based on anneal performance of another non-volatile memory element.

3. The method of claim 1, wherein determining the set of anneal characteristics is based on results of one or more previous anneals for the non-volatile memory element.

4. The method of claim 1, wherein determining the set of anneal characteristics comprises determining whether to perform one of a partial anneal and a full anneal for the non-volatile memory element.

5. The method of claim 1, wherein the one or more life cycle characteristics comprise a pattern of use for the non-volatile memory element, the pattern of use identified by a driver operating on a host, the driver monitoring data flow between the host and the non-volatile memory element.

6. The method of claim 1, wherein the one or more life cycle characteristics include one or more of a number of previous anneals, an age, a program/erase count, a failed bit count, and an error rate for the non-volatile memory element.

7. The method of claim 1, wherein the one or more of the anneal temperature and the anneal duration increases for successive anneals of the non-volatile memory element.

8. The method of claim 1, further comprising performing a garbage collection operation that moves valid data off of the non-volatile memory element in response to determining that a time remaining before annealing the non-volatile memory element satisfies a threshold, the threshold based on a time to move remaining valid data off of the non-volatile memory element.

9. The method of claim 8, wherein determining that the remaining time before annealing satisfies the threshold is in response to determining that the remaining time before annealing does not exceed the time to move remaining valid data off of the non-volatile memory element, plus a predetermined margin.

10. The method of claim 1, further comprising delaying annealing the non-volatile memory element in response to determining that an endurance gain for annealing the non-volatile memory element does not exceed write amplification caused by moving valid data off of the non-volatile memory element.

11. The method of claim 10, further comprising determining the endurance gain for annealing the non-volatile memory element based on one or more of the anneal duration, the anneal temperature and the one or more life cycle characteristics.

12. A system comprising:
    an array of non-volatile memory elements;
    a heating element for annealing one or more of the non-volatile memory elements; and
    a controller configured to
        select a non-volatile memory element for annealing, from the array of non-volatile memory elements, based on one or more life cycle characteristics of the selected non-volatile memory element,
        determine an anneal duration for annealing the selected non-volatile memory element, the anneal duration based on the one or more life cycle characteristics, and
        control the heating element to anneal the selected non-volatile memory element for the determined anneal duration.

13. The system of claim 12, wherein the controller is further configured to:
    determine an anneal temperature, based on the one or more life cycle characteristics, for annealing the selected non-volatile memory element; and
    control the heating element to anneal the selected non-volatile memory element for the determined anneal temperature.

14. The system of claim 12, wherein the controller is further configured to perform a garbage collection operation that moves valid data off of the selected non-volatile memory element in response to determining that a time remaining before annealing the selected non-volatile memory element satisfies a threshold, the threshold based on a time to move remaining valid data off of the selected non-volatile memory element.

15. An apparatus comprising:
    a controller configured to,
        identify one or more life cycle characteristics of a non-volatile storage element;
        select an anneal duration and an anneal temperature for annealing the non-volatile storage element, the anneal duration and the anneal temperature both selected based on the one or more life cycle characteristics; and
        anneal the non-volatile storage element using the selected anneal duration and anneal temperature.

16. The apparatus of claim 15, wherein selecting an anneal duration and an anneal temperature comprises determining whether to perform one of a partial anneal and a full anneal for the non-volatile storage element.

17. The apparatus of claim 15, wherein the controller is further configured to perform a garbage collection operation that moves valid data off of the non-volatile storage element in response to determining that a time remaining before annealing the non-volatile storage element satisfies a threshold, the threshold based on a time to move remaining valid data off of the non-volatile storage element.

18. The apparatus of claim 15, wherein the controller is further configured to delay annealing the non-volatile storage element in response to determining that an endurance gain for annealing the non-volatile storage element does not exceed write amplification caused by moving valid data off of the non-volatile storage element.

19. The apparatus of claim 15, wherein the controller comprises a hardware controller for a storage device, the storage device comprising the non-volatile storage element.

20. The apparatus of claim 15, wherein the controller comprises a device driver for a storage device, the storage device comprising the non-volatile storage element, the device driver comprising one or more of logic hardware and executable code, the executable code stored on one or more computer readable storage media.

* * * * *